United States Patent [19]

House

[11] 4,033,478

[45] July 5, 1977

[54] CUP DISPENSER

[75] Inventor: Bruce F. House, Miami, Fla.

[73] Assignee: Shelley Manufacturing Company Division of Alco Food Service Equipment Company, Miami, Fla.

[22] Filed: Dec. 22, 1975

[21] Appl. No.: 642,783

[52] U.S. Cl. .................................. 221/279; 221/310

[51] Int. Cl.[2] .......................................... B65G 59/00

[58] Field of Search .......... 221/303, 307, 310, 221, 221/226, 279, 280, 64, 297, 308, 309; 312/43, 45

[56] References Cited

UNITED STATES PATENTS

| | | | |
|---|---|---|---|
| 1,010,320 | 11/1911 | Ruehs | 221/310 |
| 1,256,913 | 12/1911 | Lwellen | 221/310 |
| 3,186,593 | 6/1965 | Miotke | 221/297 |
| 3,203,587 | 8/1965 | Mount et al. | 221/279 |
| 3,435,987 | 4/1969 | Saunders et al. | 221/307 |

*Primary Examiner*—Robert B. Reeves
*Assistant Examiner*—H. Grant Skaggs
*Attorney, Agent, or Firm*—Ernest H. Schmidt

[57] ABSTRACT

A cylindrical, vertically-extending container having an interior, spring-pressed pressure head is adapted resiliently to constrain inverted stacks of paper cups upwardly against a plurality of radially-inwardly-extending, downwardly-directed, arcuate leaf springs, the upper ends of which springs are secured against upper end portions of the container in peripherally-spaced relation, and the lower ends of which springs extend through side openings in the container for free movement therethrough upon flexure thereof, thereby permitting manual withdrawal, one at a time, of stacked cups.

1 Claim, 3 Drawing Figures

CUP DISPENSER

This invention relates to food or beverage dispensing containers of the type used in cafeterias, for example, and is directed particularly to a self-leveling cup dispenser which is particularly well suited for self-service dispensing from the counter top of a food service line.

Self-service cup dispensers permitting withdrawal of contained, stacked cups one at a time, are known. Such cup dispensers heretofore devised, however, presented cups for removal at the lower end of a container in which they were stacked for dispensing, and relied on gravity feed for positioning the next successive cup to be dispensed into withdrawal position. The principal object of this invention is to provide a novel and improved cup dispenser that presents cups from below for dispensing at the top of the container in which they are stacked, whereby the container can be suspended from its upper end through an opening in the counter top of a serving line for counter top dispensing.

A more particular object of the invention is to provide a disposable beverage cup dispenser of the above nature wherein a spring-pressed pressure head is adapted resiliently to constrain inverted stacks of paper cups or the like against a plurality of radially-inwardly-extending, downwardly-directed arcuate leaf springs, the upper ends of which are secured against upper end portions of a cylindrical container in which the cups are stacked in peripherally-spaced relation thereabout, and the lower ends of which extend through side openings in the container for free movement therethrough, such flexure of the leaf springs permitting upward manual withdrawal, one at a time, of the stacked cups.

Another object of the invention is to provide a cup dispenser of the above nature which will be simple in construction. foolproof in operation easy to reload and clean, attractive in appearance, and durable in operation.

Other objects, features and advantages of the invention will be apparent from the following description when read with reference to the accompanying drawings. In the drawings, wherein like reference numerals denote corresponding parts throughout the several views.

Figure 3:
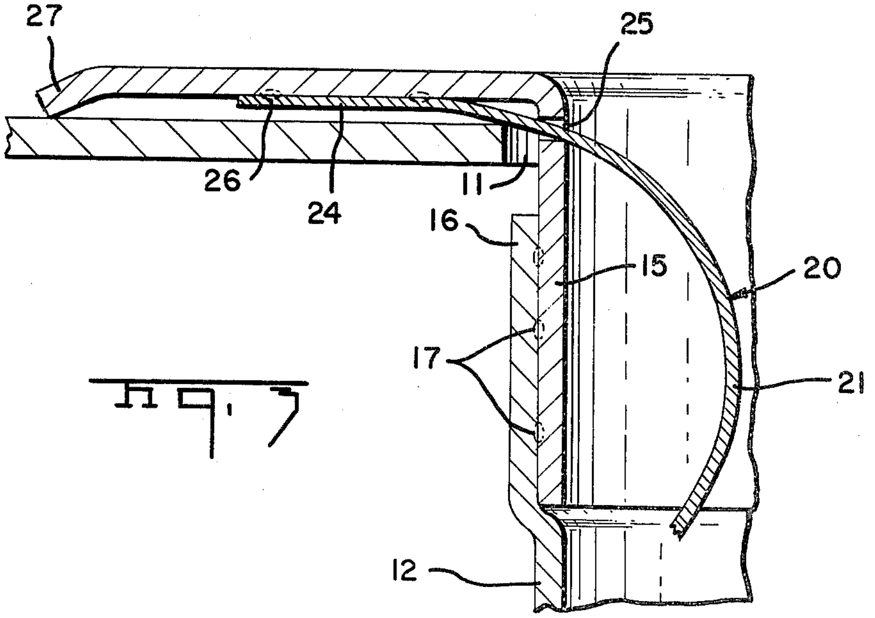
FIG. 3 is a fragmentary, vertical cross-sectional view on an enlarged scale illustrating assembly details of the cup dispenser and its operation.

Referring now in detail to the drawings, reference numeral 10 designates, generally a paper cup dispenser embodying the invention, the same being illustrated as supported upon a serving line counter top T having a suitable circular opening 11 in which it is removably received. The cup dispenser 10 comprises an elongated, cylindrical, vertically-extending tank or container 12, preferably fabricated of stainless steel, enclosed at the bottom as by a cylindrical cap 13 spot-welded or otherwise secured thereat. The upper end of the container 12 has secured thereto a radially-outwardly-extending annular flange 14. The flange 14, which is also preferably of stainless steel, is integrally formed with an inner, coaxial, peripheral skirt portion 15, the interior surface of which is cylindrical and of substantially the same internal diameter as that of the container 12. The marginal upper end portion of the container 12 is peripherally offset, as indicated at 16, to define a somewhat increased internal diameter sufficient to slidingly receive, in interfitting relation, the skirt portion 15 of the flange 14, said container and flange being permanently affixed to one another as by a plurality of spot welds 17 (see FIG. 3).

Slidably disposed within the container 12 is a cylindrically-skirted, circular pressure head 18 which is resiliently urged in the upward direction of said container by a helical compression spring 19 constrained between the underside of said pressure head and the bottom of the cylindrical cap 13 at the lower end of said container.

Means is provided for the manual withdrawing, one at a time, of stacked paper cups S supported upside down upon the pressure head 17. To this end a plurality of arcuate leaf springs 20 extend inwardly of the flange 14 at one end to curve downwardly and radially inwardly, as indicated at 21, ultimately to project through side openings 22 in the container 12, whereat they terminate in downwardly-bent end portions 23. The downwardly-bent end portions 23 serve as stop means abutting against outer wall portions of said container immediately below the respective spring side openings 22 when the dispenser is not in use, that is, when not supplied with stacked paper cups for dispensing.

The upper ends of the arcuate leaf springs 19 terminate in radially-outwardly-bent, flat portions 24 which extend through respective slots 25 in the skirt portion 15 of the flange 14 to be secured against the underside of said flange as by spot welds 26. The outer peripheral margin of the flange 14 is bent downward at an obtuse angle, as indicated at 27 in FIG. 3.

Figure 1:
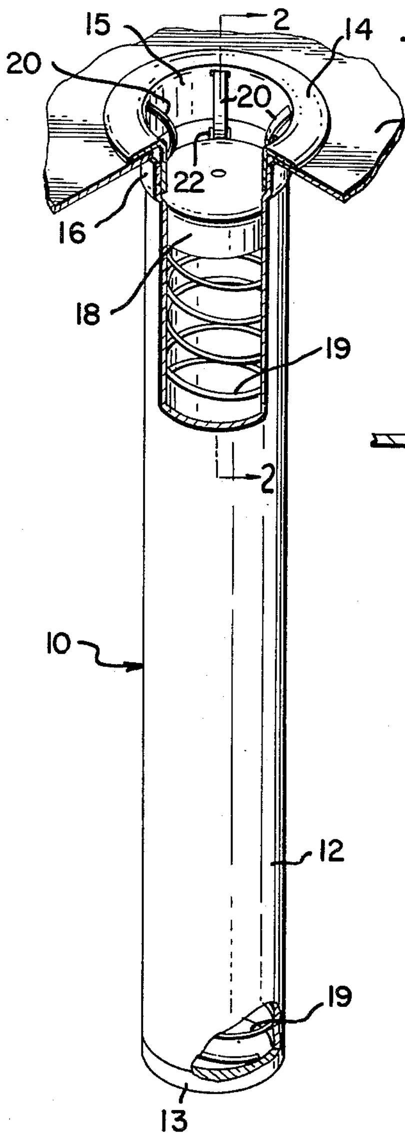
FIG. 1 is an oblique view, as viewed from above and with portions broken away to illustrate constructional details, of a paper cup dispenser embodying the invention.
Figure 2:
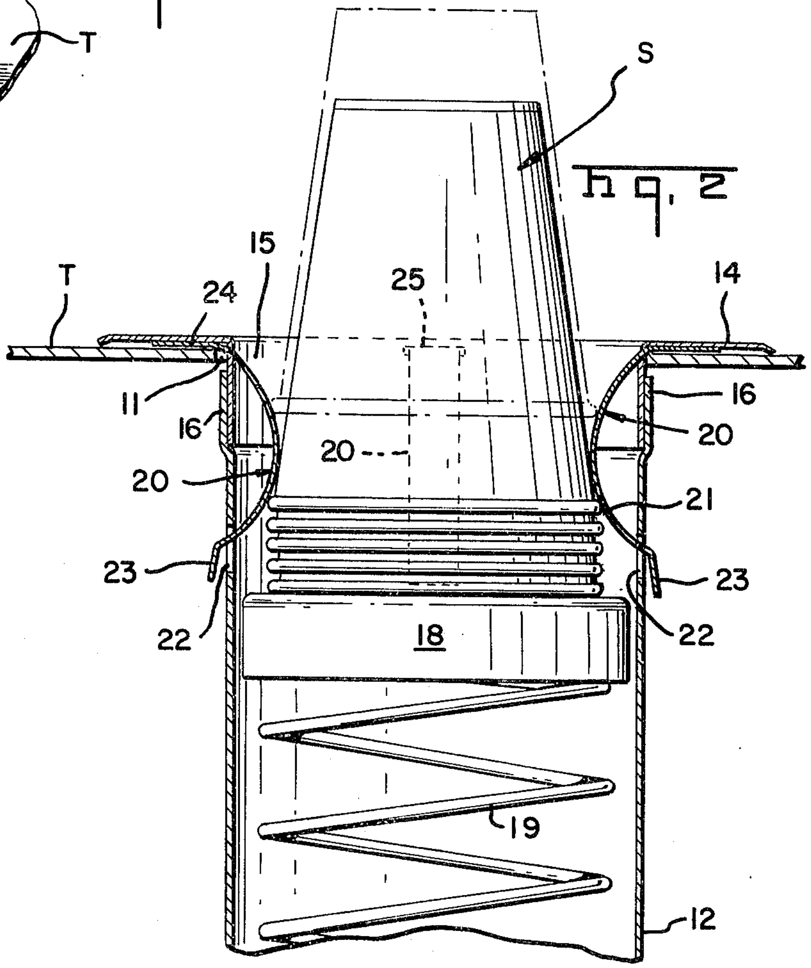
FIG. 2 is a partial vertical cross-sectional view, taken along the line 2—2 of FIG. 1 in the direction of the arrows, on an enlarged scale and showing the dispenser loaded with a stack of paper cups for self-service dispensing.

Referring now to FIG. 2 and considering the operation of the cup dispenser, it will be understood that as the uppermost protruding cup of the stack S is withdrawn, the bead or the lip at the open end of the cup, in moving outwardly of the container 12, will cause the leaf springs 20 to flex radially outwardly to a degree just sufficient to permit passage beyond said springs, as illustrated by the broken-line representation thereof whereat the cup can be freely removed from the stack for use. While the uppermost cup is thus being removed, however, the leaf springs 20 will not have flexed sufficiently to permit passage of any of the remaining cups in the stack, so that they will be retained in stacked relation, ready for the next successive dispensing operation. In this connection it will be understood that as the uppermost cup being withdrawn begins to pass outwardly of the leaf springs 20, said springs will automatically move inwardly between the reduced diameter gaps of successive ones of the stacked cups, so as to prevent the simultaneous withdrawal of two or more cups in a dispensing operation. It is further to be noted that the curvature and degree of flexure provided for in the leaf springs are such as will permit use of the device in dispensing frusto-conical cups of various sizes, that is, having a wide range of diameters at their upper or open ends.

While I have illustrated and described herein only one form in which my invention can conveniently be embodied in practice, it is to be understood that this form is given by way of example only, and not in a limiting sense. The invention, in brief, comprises all the embodiments and modifications coming within the scope and spirit of the following claims.

What I claim as new and desire to secure by Letters Patent is:

1. A self-service dispenser for disposable paper cups and the like comprising, in combination, a vertically-extending, open-top container, a plurality of arcuate leaf springs arranged within the upper end of said container in radially-inwardly-extending, downwardly-directed disposition, means for securing the upper ends of said arcuate leaf springs with respect to the upper end of said container in peripherally-spaced relation thereabout, a plurality of side openings in said container, one for each of said leaf springs, the lower ends of said arcuate leaf springs extending one each through said side openings for free movement therethrough upon radially outward flexure of said springs, and means for resiliently urging upside-down stacked frusto-conical cups in said container in the upward direction so that the peripheral lower end of the uppermost cup of the stack contacts underside portions of said arcuate leaf springs, said leaf springs being of such size and so positioned at the upper end of said container that the uppermost cup of the stack will project outwardly of the upper end of said container for convenient grasping for removal during a self-service cup dispensing operation, an annular flange secured to and extending outwardly of the upper end of said container; said means for resiliently urging stacked cups in said container in the upward direction comprising a cylindrically skirted pressure head slidably fitted in said container, spring support means at the lower end of said container, and a helical compression spring constrained between said spring support means and the underside of said pressure head; means preventing inward movement of said lower ends of said arcuate leaf springs through their respective side openings in said container; said means preventing inward movement of said lower ends of said arcuate leaf springs comprising downwardly-bent portions integrally formed at the lower ends of each of said springs and operative to abut outer wall portions of said container; said annular flange being integrally formed with an inner cylindrical skirt telescopingly secured within a marginal upper end portion of said container; and said means for securing the upper ends of said leaf springs with respect to the upper end portion of said container comprising peripherally-spaced slots in said flange skirt portion through which upper end portions of said leaf springs extend, and spot welds securing terminal upper end portions of said leaf springs to the underside of said annular flange.

* * * * *